Aug. 8, 1939.     W. BROWN     2,168,600
EPICYCLIC CHANGE SPEED GEAR
Filed Sept. 20, 1937
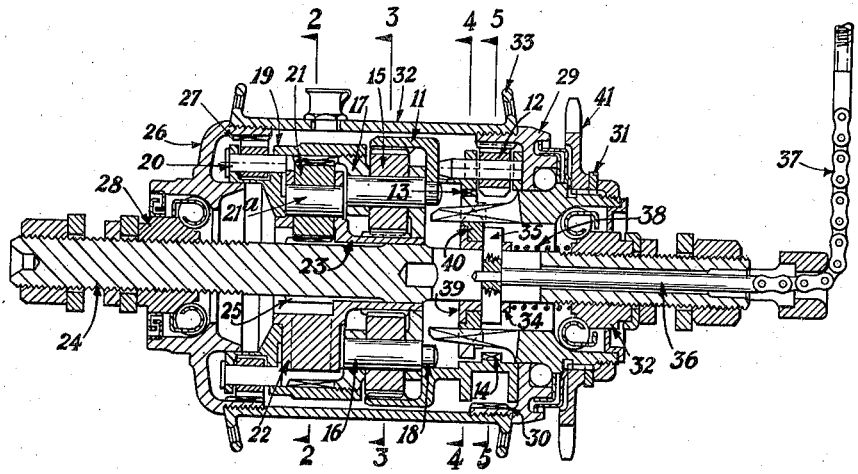
Fig.1.
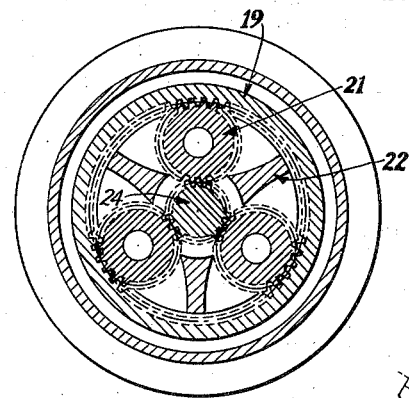
Fig.2.
Fig.6.
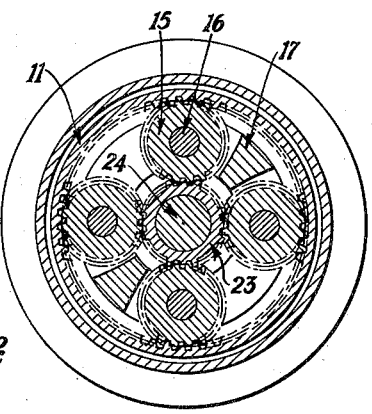
Fig.3.
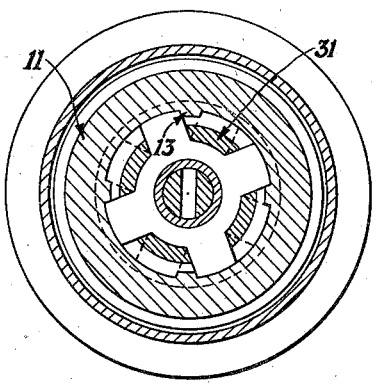
Fig.4.
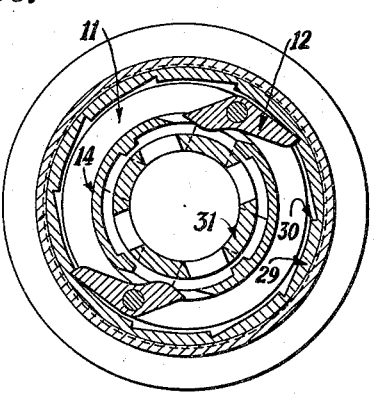
Fig.5.
Inventor:-
William Brown
By his Attorney:- Walter Gunn Patented Aug. 8, 1939

2,168,600

UNITED STATES PATENT OFFICE 2,168,600

EPICYCLIC CHANGE SPEED GEAR

William Brown, Wollaton Park, Nottingham, England, assignor to Sturmey-Archer Gears Limited, Nottingham, England Application September 20, 1937, Serial No. 164,731
In Great Britain September 26, 1936

4 Claims. (Cl. 74—266)

This invention relates to epicyclic change speed transmission gearing of the kind in which a driving member may be coupled to the driven member through one or more epicyclic gear trains so as to give an increase or decrease in speed of the driven member, or alternatively, the driving and driven members may be coupled directly together to give a direct drive, the gears then being allowed to idle.

The main object of the invention is to provide a gear of this kind having what is known as close ratios and the principal difficulty in doing this with the known type of gearing is that it necessitates considerable increase in the size of the gear. There are also other considerations which have been kept in mind while involving the present improved construction of gear such as that it may be capable of transmitting a heavy load relative to its size; that it may have low wear and long life due to low relative speed ratio of its moving parts and the provision of large gearing surfaces and a large number of teeth in mesh with each other while transmitting the load. A further object of the invention is to provide a direct drive intermediate of higher and lower gear ratios and without locking the gears together.

According to the invention, the improved gear comprises a main epicyclic gear train, two elements of which are coupled to two elements of a secondary epicyclic gear train, the third element of which latter is or may be held stationary so that a forward movement of the third and free element of the main epicyclic train is accompanied by a forward movement of its other two elements, one of which latter has only a small movement relative to the said free member.

In the accompanying drawing:

Fig. 1 is a sectional side elevation of a cycle hub incorporating one example of three-speed gear made in accordance with the invention but in which some of the sections are displaced radially for the sake of clearness.

Fig. 2 is a cross section on line 2—2 of Fig. 1 showing the secondary gear train.

Fig. 3 is a cross section on line 3—3 of Fig. 1, showing the primary gear train.

Fig. 4 is a cross section on line 4—4 of Fig. 1 showing the dog clutch drive to the primary gear ring.

Fig. 5 is a cross section on line 5—5 of Fig. 1 showing the pawl drive from the primary gear to the hub body.

Fig. 6 is an end elevation of the pawl showing the side bevel on one end, the purpose of which is described later.

As illustrated, the improved gear is constructed as a three-speed cycle hub giving close ratios suitable for racing purposes. The gear, will, of course, have many other uses, but it is particularly designed and intended for such aforementioned use.

As shown in Fig. 1, the primary or main epicyclic gear train consists of the annular gear ring 10 11 extended at one end to carry primary driving pawls 12 and having on its inner bore two sets of dogs 13 and 14, in separate planes for alternative selection (see also Figs. 4 and 5). The dogs 13 and 14 are parallel and concentric to the axis of the gear ring but the two sets of dogs are displaced angularly from each other so that the dogs 14 lie between the dogs 13 when viewed from the end. Meshing with the said annular gear ring 11 are planet pinions 15 carried on pins 16 which are extended through bearings in a planet cage 17 to form driving dogs 18, adjacent to and in a separate plane from the aforesaid sets of dogs. This planet cage 17 has formed with it, or attached to it, a secondary annular gear ring 19, which is extended in the other direction (i. e., away from its pinions) to carry secondary driving pawls 20. Meshing with the secondary gear ring 19 are secondary planet pinions 21 journaled on pins 21a mounted in a secondary planet cage 22. This secondary planet cage 22 has formed on it, or attached to it, a pinion 23 which meshes with the primary planet pinions 15 so forming the primary sun pinion and completing the primary or main epicyclic gear train (see Fig. 3).

Concentric with the foregoing parts lies an axle 24 on which is formed or fixed a pinion 25 which meshes with the secondary planet pinions 21 so forming the secondary sun pinion and completing the secondary epicyclic gear train (see Fig. 2). The secondary planet cage 22 is journaled into the secondary gear ring 19 at one end, and into the primary planet cage 17 at the other, so making the assembly a concentric one with itself and with the axle 24 and providing good bearing surfaces.

Further, the primary gear ring 11 is centralised by the extensions 18 on the planet pinion pins 16 engaging with its bore. The drive is taken from the left hand end of the gear by secondary driving pawls 20 to a supporting piece 26 which carries ratchet teeth 27 operating in a forward direction. This supporting piece 26 is journaled into the secondary gear ring 19 so supporting it centrally with the axle 24 and is itself mounted on ball bearings to a cone 28 screwed to the axle. The drive is taken from the other end of the gear by the primary pawls 12 to another supporting piece 29 which carries ratchet teeth 30 also operating in a forward direction (see also Fig. 5). Carried in a ball journal in this supporting piece 29 is the driving member 31 which is further supported by a ball journal on a cone 32 screwed to the axle 24. An extension of the driving member 31 through the first supporting piece 29 is journaled into the primary gear ring 11 so keeping it concentric with the axis of the whole assembly. Between and fixed to the two end supporting pieces 26 and 29 is mounted a shell 32 which performs the several functions of spacing the supporting pieces 26 and 29, forming a casing for the whole mechanism, and forming fixing flanges 33 for building a cycle wheel by means of spokes in the usual manner.

Also, on the axle 24 is slidably mounted a sleeve 34 operable by a key 35, rod 36 and chain 37 in known manner. A spring 38 acting between the sleeve 34 and the adjacent cone 32 is used to move the sleeve 34 to the left and movement in the other direction is obtained by a pull applied to the said chain 37. Rotatably mounted on the sleeve 34 and laterally positioned by a collar 39 formed on the sleeve and the said key 35, is a sliding dog 40 which engages with the driving member 31, being carried in a rotatable manner by it while still free to be moved laterally by the sleeve 34 and key 35. Also mounted on the driving member 31 in the application of the gear to a cycle hub, is a chain sprocket 41, the mounting being by dogs in the example described, so that power can be transmitted to the driving member 31 by means of a chain from the usual bracket chain-wheel (not shown). This dog clutch 40 can engage alternatively with the driving dogs 18 which are extensions of the pins 16 of the primary pinions fixed into and projecting from the main planet cage 17 or with either set of dogs 13 or 14 on the primary gear ring 11 as determinable by means of the chain control 37, so giving gear ratios as described hereunder.

The complete epicyclic train is such that if a turning effort be applied to the primary gear ring 11, the primary planet cage 17 will be carried round in the same direction but at a reduced speed, such speed being governed by the numbers of teeth in said primary gear ring 11 and primary sun pinion 23, and also by the fact that this primary sun pinion is rotated in the same direction by action of the secondary gear ring 19 (which is attached to and rotates with the primary planet cage 17) acting on the secondary planet cage 22 by medium of the secondary planet pinions 21 which mesh with the secondary gear ring 19 and with the secondary sun pinion 25 which latter is fixed to the axle 24 which in turn is held in a non-rotatable manner, this latter being adapted in known manner for fixing to the rear forks of a cycle frame. It will therefore be seen that a fixed ratio exists between the primary gear ring 11 and the secondary gear ring 19. Further, this same ratio also exists between the primary gear ring 11 and the primary planet cage 17 by virtue of the fact that such primary planet cage and secondary gear ring are fixed so as to rotate together. Further it will be seen that this ratio is such that the primary gear ring 11 will rotate faster than the secondary gear ring 19 and the primary planet cage 17, the difference of speed of rotation resulting from a differential effect of the two epicyclic gear trains governed by the numbers of teeth in the two gear rings 11 and 19 and in their sun pinions 23 and 25. The number of teeth in the planet pinions of either gear train has no bearing on the gear ratio obtainable, their sizes being such that they will mesh with their respective sun pinions and gear rings so completing the two epicyclic gear trains. Having described the gear in itself the description of the method of utilising the gears is as under:

For direct drive the sliding dog 40 is engaged with the inner set of dogs 13 on the primary gear ring 11. Power is transmitted by the driving member 31 through this sliding dog to the gear ring 11 by way of such dogs. Since it has been shown that under all circumstances the primary gear ring 11 rotates faster than the secondary gear ring 19, this driving effort will be transmitted through the pawls 12 carried by the primary gear ring to the adjacent supporting piece 29 and so to the hub shell 32, so driving the wheel. Meanwhile the gears are idling and the other supporting piece 26 will over-run its coacting pawls 20.

For high gear the sliding dog 40 is allowed to be moved by its spring 39 to engage with the driving dogs 18. Power is then transmitted from the driving member 31 through the sliding dog 40 to the dogs 18 and so to the primary planet cage 17. Since it has been shown that the primary gear ring 11 rotates faster than the primary planet cage 17 by virtue of the gears described above, the drive will continue through the combined or differential effect of the primary and secondary epicyclic gear trains to the primary gear ring 11 and so to the hub shell 32 exactly as described above for direct gear, the shell 32 now rotating faster than the driving member 31 and the supporting piece 26 at the other end of the gear over-running its coacting pawls 20 as before described.

For low gear the sliding dog 40 is moved in the other direction so that it engages with the other set of dogs 14 on the primary gear ring 11. In moving from engagement from the first dogs 13 the dog will first move laterally to a position behind the pawls 12 and will then rotate by virtue of the power communicated by the driving member 31 until it engages with the second set of dogs 14 which are radially displaced from the first dogs. During this small arc of rotation no power is being transmitted from the driving member 31 to the gear assembly, and so the pawls 12 are not under load. These pawls which have hitherto transmitted the drive to the shell, are formed with chamfered tail pieces 42 (see Fig. 6) which are adapted to be engaged by the sliding dog 40 during this small arc of rotation so as to lift this end of the pawls to disengage the other end of the pawls by depressing them from the ratchet teeth of its coacting supporting piece 29. When such disengagement has been effected the dog 40 engages the second set of dogs 14 and through them the drive is applied direct to the primary gear ring. The relationship of the pawl pivot pins of the pawls 12, the driving dogs 14 and the width of the dog 40 is such that when the dog takes up its driving position against the dogs 14 the pawls 12 are held out of engagement with the teeth 30 of the supporting piece 29. In this position the drive will be transmitted from the driving member 31 to the dog 40 and from thence to the gear ring 11 through the dogs 14. Since the primary gear ring 11 is no longer in connection with its adjacent supporting piece 29 and it has been shown that such primary gear ring 11 always rotates faster than the secondary gear ring 19, the drive will proceed through the gear trains and be transmitted to the other supporting piece 26 by its coacting pawls 20, such supporting piece 26 and the shell 32 now rotating slower than the driving member 31 which is rotating at the same speed as the primary gear ring 11 by virtue of the direct coupling which exists between them, this coupling being the dog 40. It will further be noted that in changing from direct drive to low gear as above described in the event of the driver member 31 being stationary and the hub shell rotating, so over-running both sets of pawls 12 and 20, the drag of the mechanism will cause the sliding dog 40 to take up a position on the non-driving face of the first set of dogs 13. To enable the sliding dog 40 to move laterally the chamfer 42 is cut on the pawls of the first set (see Fig. 6) so that the sliding dog will be able by virtue of the wedging action of this chamfer to move axially while elevating the pawls 12 and then drop back to the non-driving face of the second set of dogs 14. In taking up the drive again, the sliding dog 40 will elevate the pawls 12 by their rearmost shape before driving on the dogs 14 as previously described. The pawls between them provide a free wheel action in all the gear ratios.

To demonstrate the close ratio which can easily be obtained by the improved construction, while using quite ordinary gear wheels the following details are given. The primary gear ring, sun wheel and planet wheels have 60, 20 and 20 teeth respectively while the secondary gear ring, sun wheel and planet wheels have 54, 15 and 20 teeth respectively. With such gear wheels, top gear provides only 7.24% increase over normal or direct drive while low gear provides 6.76% decrease. For example, using the usual nomenclature, the the gear ratios could be approximately 93¼, 100 and 107¼.

In addition to attaining the objects first explained it will be seen that the improved gear has many important advantages over existing speed gears of its kind, for example, the gear change can be effected while the load is on, provided it is not excessive.

Obviously the invention is not limited to the details of the example above described, many of which could be modified without departing from the nature of the invention, the principal features of which are as follows:

1. The sun pinion of the primary gear train is geared to the driving or driven member of primary gear train by a secondary epicyclic gear train in such manner that the primary sun pinion is driven in the direction of the driving or driven member so reducing the gear ratio increase or decrease existing between the driving member and driven member of the primary epicyclic gear train.

2. The driving member can transmit power to the driven member in a ratio of one to one, or give a fixed increase or decrease of gear to such driven member at will, said increase or decrease being adjustable by the numbers of teeth in the gear trains, and being in closer ratio to the direct one to one drive than that obtainable in an orthodox epicyclic gear of similar size.

3. All rotating parts are so journaled to each other and to the casing of the gear as to be concentric one with another and with the axis of the casing under all conditions and with a minimum of relative movement.

4. The gear ratio can be changed at will by means of a movable coupling between the driving and driven members while the gear is in use.

5. All gear trains are journaled on either side of said gear trains to eliminate strains due to overhung loads.

6. The relative speeds of the parts of the gear are kept lower than in orthodox epicyclic gears thus increasing life of the gears and also the load transmissible by them for a given size of gear.

What I claim is:

1. In an epicyclic change speed gear of the kind comprising two epicyclic trains of gearing coupled together so that the planet carrier and annulus of one train are connected respectively to the sun pinion and planet carrier of the other train for rotation together leaving a solitary sun pinion and a solitary annulus, means holding the said solitary sun pinion stationary, means for coupling a driving member alternatively to either of the annuli, and further coupling means between each of the annuli and a driven member whereby when the driving member is coupled to the said connected planet carrier and annulus the said solitary annulus is coupled to the driven member whilst when the driving member is coupled to the solitary annulus either of the annuli is alternatively coupled to the driven member.

2. In an epicyclic change speed gear of the kind comprising two epicyclic trains of gearing coupled together so that the planet carrier and annulus of one train are connected respectively to the sun pinion and planet carrier of the other train for rotation together leaving a solitary sun pinion and a solitary annulus, means holding the said solitary sun pinion stationary, means for coupling a driving member alternatively to either of the annuli, free wheel coupling means between each of the annuli and a driven member and means for disengaging one of said free wheel coupling means whereby when the driving member is coupled to the said connected planet carrier and annulus the said solitary annulus is coupled to the driven member whilst when the driving member is coupled to the solitary annulus either of the annuli is alternatively coupled to the driven member.

3. In an epicyclic change speed gear comprising two epicyclic trains of gearing coupled together so that the planet carrier and annulus of one train are connected respectively to the sun pinion and planet carrier of the other train for rotation together, leaving a solitary sun pinion and a solitary annulus, means holding the said solitary sun pinion stationary, a driving member, a sliding dog carried by the driving member, three sets of complementary dogs adapted to be engaged alternatively by the sliding dog, the first set being on the connected planet carrier and annulus, whilst the second and third sets are both on the solitary annulus, in separate planes and circumferentially displaced so that the dogs of the second set lie between those of the third set, free wheel coupling means between each of the annuli and a driven member, the free wheel coupling means for the solitary annulus comprising pawls adjacent to the third set of dogs aforesaid and contacted by the sliding dog in its combined sliding and part rotational movement in passing from the second set of dogs to the third set so as to disengage the pawls, or to release the pawls for re-engagement as the sliding dog passes back to the second set of dogs.

4. In an epicyclic change speed gear comprising two epicyclic trains of gearing coupled together so that the planet carrier and annulus of one train are connected respectively to the sun pinion and planet carrier of the other train for rotation together, leaving a solitary sun pinion and a solitary annulus, means holding the said solitary sun pinion stationary, a sliding dog for coupling a driving member alternatively to either annuli, free wheel coupling means between each of the annuli and a driven member, and means actuated by the sliding dog for disengaging one of said free wheel coupling means whereby when the driving member is coupled to the said connected planet carrier and annulus the said solitary annulus is coupled to the driven member whilst when the driving member is coupled to the solitary annulus either of the annuli is alternatively coupled to the driven member.

WILLIAM BROWN.